United States Patent

Czarnecki et al.

[11] Patent Number: 5,431,446
[45] Date of Patent: Jul. 11, 1995

[54] SEAT BELT PRESENTER

[75] Inventors: Donald P. Czarnecki, Marysville; Louis R. Brown, Oxford; Steven R. Loxton, Lakeport; Roger P. Daniel, Dearborn, all of Mich.; Timothy G. Laske, Shoreview, Minn.

[73] Assignees: Ford Motor Company, Dearborn, Mich.; TRW Vehicle Safety Systems Inc., Lyndhurst, Ohio

[21] Appl. No.: 224,153

[22] Filed: Apr. 7, 1994

Related U.S. Application Data

[63] Continuation-in-part of Ser. No. 926,034, Aug. 5, 1992, abandoned.

[51] Int. Cl.6 ............................................. B60R 22/03
[52] U.S. Cl. .................................. 280/802; 297/469; 297/481
[58] Field of Search ............... 280/802, 801.1, 808, 280/804; 297/469, 481, 483

[56] References Cited

U.S. PATENT DOCUMENTS

| | | | |
|---|---|---|---|
| 4,118,068 | 10/1978 | Föhl | 297/481 |
| 4,382,614 | 5/1983 | Kubota | 280/802 |
| 4,451,061 | 5/1984 | Takada | 280/802 |
| 4,679,821 | 7/1987 | Yamamoto et al. | 280/808 |
| 4,982,982 | 1/1991 | Nishimura | 280/808 |
| 5,261,696 | 11/1993 | Hamave | 280/802 |

FOREIGN PATENT DOCUMENTS

4103451 4/1992 Japan ..................... 280/808

*Primary Examiner*—Karin L. Tyson
*Attorney, Agent, or Firm*—Tarolli, Sundheim & Covell

[57] ABSTRACT

A seat belt presenter (10) for an active seat belt system (14) for restraining a vehicle occupant includes a guide (82) having surfaces (87) which surround opposite major side surfaces (41, 43) of belt webbing (40). A lift arm (74) has an end portion (78) to which the guide (82) is attached. The lift arm (74) is movable between a presented position in which the guide (82) supports a tongue assembly (48) adjacent to the vehicle occupant and a stored position in which the guide is disposed when the tongue assembly is engaged with a buckle (50). A spring (110) biases the lift arm (74) and the guide (82) to the presented position. A motor (130) when energized moves the lift arm (74) and the guide (82) to the stored position. The guide (82) is maintained at a constant attitude angle as the lift arm (74) moves between the presented and stored positions.

39 Claims, 7 Drawing Sheets

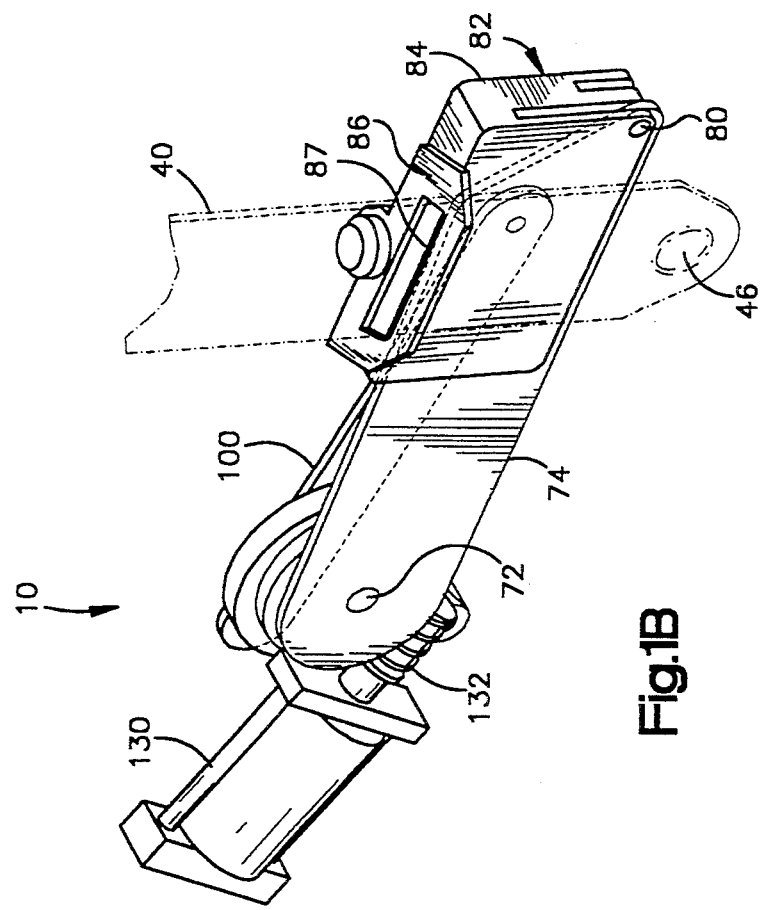
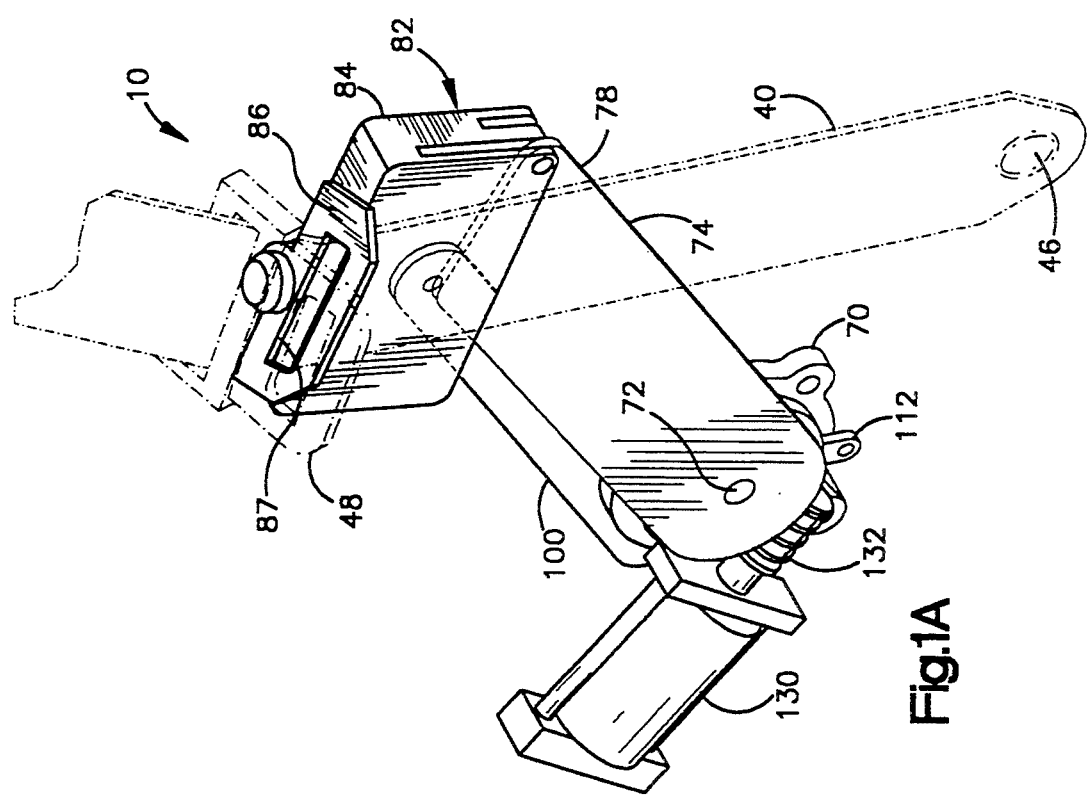
Fig.1B
Fig.1A

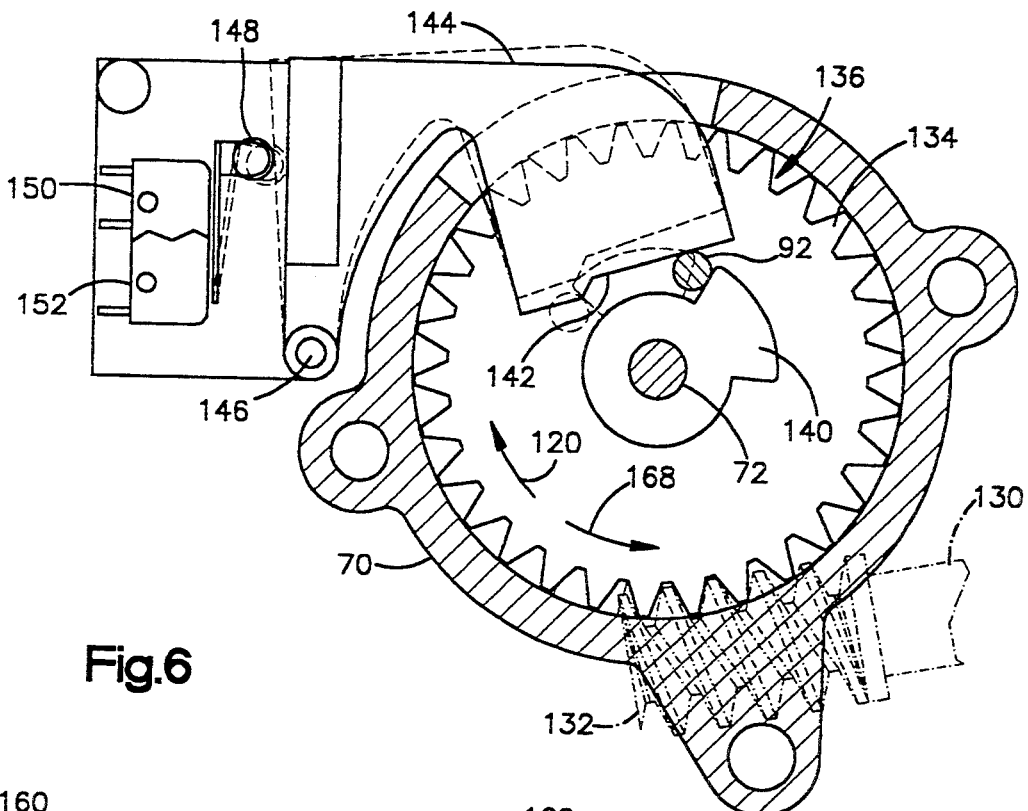
Fig.6
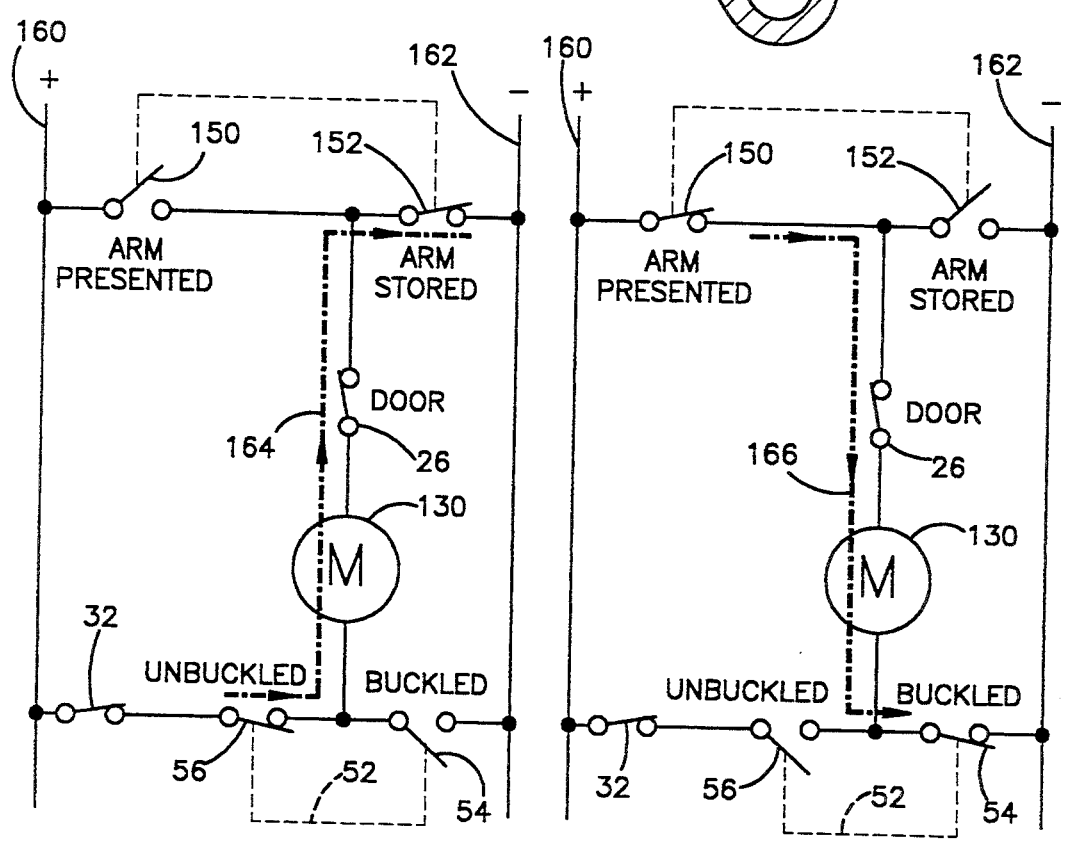
Fig.7A
Fig.7B

SEAT BELT PRESENTER

RELATED APPLICATION

This application is a continuation-in-part application of U.S. application Ser. No. 926,034, Filed Aug. 5, 1992, abandoned entitled "Belt Lifting Mechanism for a Passive Seat Belt System".

BACKGROUND OF THE INVENTION

1. Technical Field

The present invention relates to a seat belt presenter, and is particularly directed to a seat belt presenter for an active seat belt system of a vehicle.

2. Description of the Prior Art

A typical three-point continuous loop active seat belt system when in a stored position includes a length of seat belt webbing which extends from a seat belt retractor at the base of the vehicle B-pillar, up through a D-ring at the top of the B-pillar, and down to an anchor at the outboard side of the seat. A tongue assembly is slidable on the belt webbing. The tongue assembly is engageable with a buckle on the inboard side of the seat.

A seat occupant grasps the tongue assembly while the belt webbing is in its stored position typically by reaching to the outboard side of the seat. This can be more difficult if the seat is moved forward or if the interior of the vehicle is darkened, such as at night. After accessing the tongue assembly, the occupant pulls it around his or her body and inserts the tongue into the buckle.

Seat belt presenters are known which move the belt webbing and/or the tongue assembly into a position which is more accessible to the vehicle occupant. For example, U.S. Pat. No. 4,982,982 discloses a swing arm pivotally mounted to a vehicle B-pillar. The swing arm is spring biased to a forward position in which it supports a tongue assembly at a location forward of the B-pillar and adjacent to the vehicle seat. The prior art also discloses passive seat belt systems which present the webbing (without a tongue assembly) for a passive seat belt system at a location enabling convenient ingress to and egress from the vehicle seat. When an individual enters the vehicle and closes the vehicle door, the belt webbing is moved to a restraint position extended about the lap or torso of the individual. Examples of this type of device are shown in U.S. Pat. Nos. 4,382,614 and 4,451,061.

SUMMARY OF THE INVENTION

The present invention is a seat belt presenter for a three-point continuous loop active seat belt system for restraining a vehicle occupant. The seat belt system includes a length of belt webbing having opposite major side surfaces, a tongue assembly slidable along the belt webbing, and a buckle with which the tongue assembly is engageable by the occupant to restrain the occupant.

The seat belt presenter includes a seat belt guide having surfaces which engage the opposite major side surfaces of the belt webbing. A lift arm has an end portion to which the guide is attached. The lift arm is movable between a stored position and a presented position in which the guide supports the tongue assembly adjacent to the vehicle occupant. The guide surfaces move relative to the opposite major side surfaces of the belt webbing as the lift arm and the guide move between the stored position and the presented position. A spring biases the lift arm and the guide to the presented position. A motor, when energized, moves the lift arm and the guide to the stored position.

In a preferred embodiment of the invention, the guide is maintained at a substantially constant attitude angle, preferably about 15° off of horizontal, as the lift arm moves between the stored and presented positions. Thus, the seat belt does not twist, jamming of the seat belt in the guide is avoided, and the seat belt remains flat.

The seat belt presenter can be mounted on or adjacent to the vehicle seat. Alternatively, the seat belt presenter can be mounted on the vehicle B-pillar.

BRIEF DESCRIPTION OF THE DRAWINGS

The foregoing and other features of the present invention will become apparent to one skilled in the art to which the present invention relates upon a consideration of the following description of the invention with reference to the accompanying drawings, wherein:

FIG. 1A is an enlarged perspective view of the presenter of FIG. 1 showing a lift arm of the presenter in a presented position;

FIG. 1B is a view similar to FIG. 1A showing the lift arm in a stored position after buckling the seat belt;

FIG. 6 is a view, partly in section and with parts removed, of a portion of the presenter of FIG. 2, taken along line 6—6 of FIG. 2;

FIG. 7A is a schematic illustration of electrical components of the presenter of FIG. 1 in a condition during movement of the lift arm from the stored position to the presented position;

FIG. 7B is a view similar to FIG. 7A showing the components in a condition during movement of the lift arm from the presented position to the stored position.

DESCRIPTION OF PREFERRED EMBODIMENTS

Figure 1:
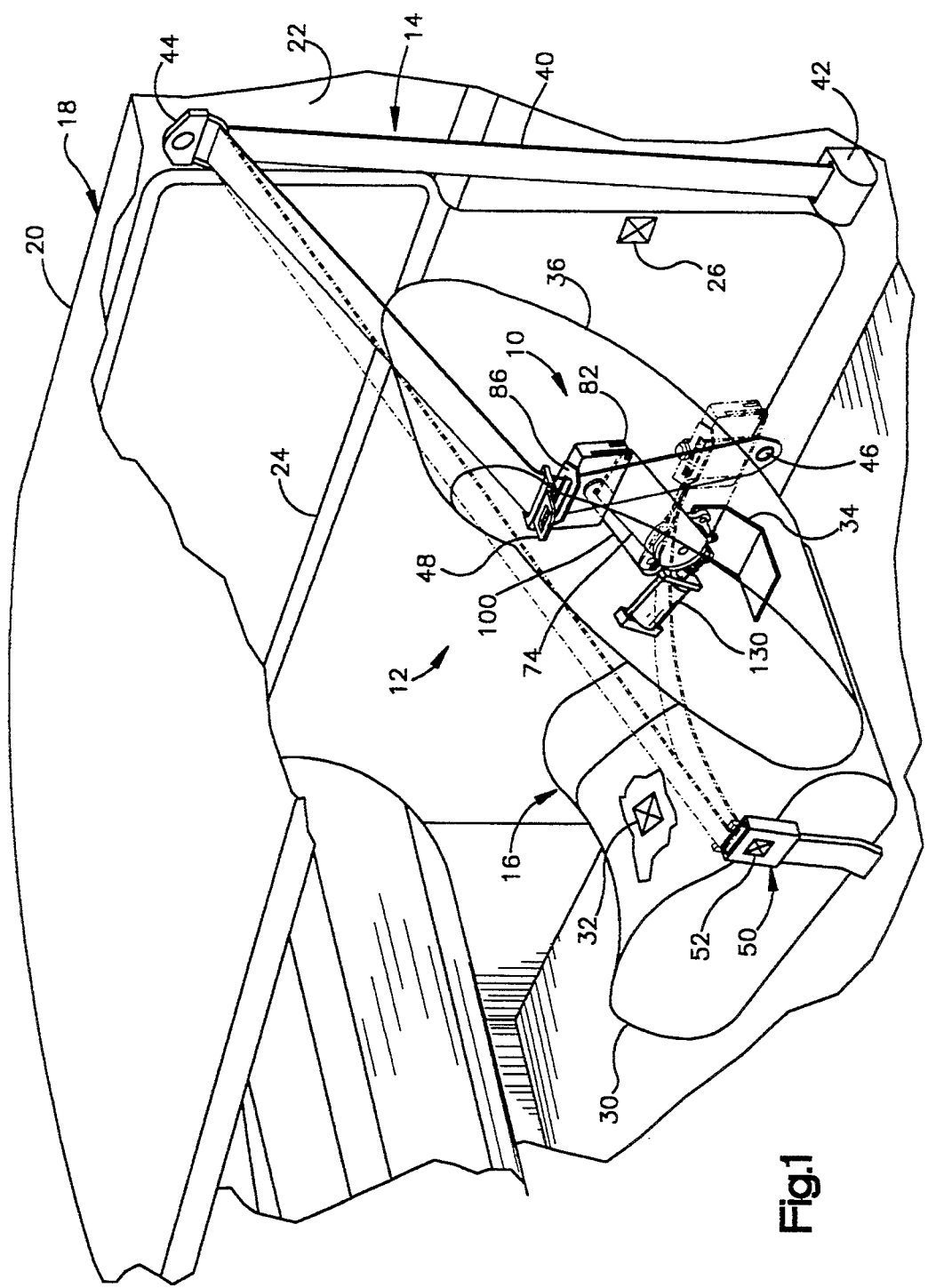
FIG. 1 is a perspective view of a seat-mounted seat belt presenter in accordance with the present invention and incorporated in a vehicle occupant restraint system which includes a three point continuous loop active seat belt system.

The present invention relates to a seat belt presenter, and is particularly directed to a seat belt presenter for an active seat belt system for a vehicle. The present invention is applicable to various seat belt presenter constructions. As representative of the present invention, FIG. 1 illustrates a seat belt presenter 10.

The presenter 10 is associated, as part of a vehicle occupant restraint system 12, with a three-point continuous loop seat belt system 14. The seat belt system 14 is extensible about an occupant of a front passenger seat 16 of a vehicle 18. The seat 16 is movable in a known manner in forward and rearward directions in the vehicle 18.

The vehicle 18 includes a vehicle body, portions of which are indicated schematically at 20. The vehicle body 20 includes a B-pillar 22 disposed behind a front passenger door 24 of the vehicle 18. A door switch indicated schematically at 26 (FIGS. 1 and 7A) includes a set of electrical contacts which are closed when the door 24 is closed and which are open when the door is opened.

The vehicle seat 16 includes a seat bottom cushion 30. Disposed in the seat bottom cushion is a seat switch indicated schematically at 32. The seat switch 32 (FIGS. 1 and 7A) includes a set of electrical contacts which are closed when the seat 16 is occupied by a vehicle occupant, and which are open when the seat is not occupied by a vehicle occupant. The seat bottom cushion 30 (FIG. 1) also includes a seat frame member, a portion of which is shown schematically at 34. A seat back 36 is connected with the seat bottom cushion 30.

Figure 3:
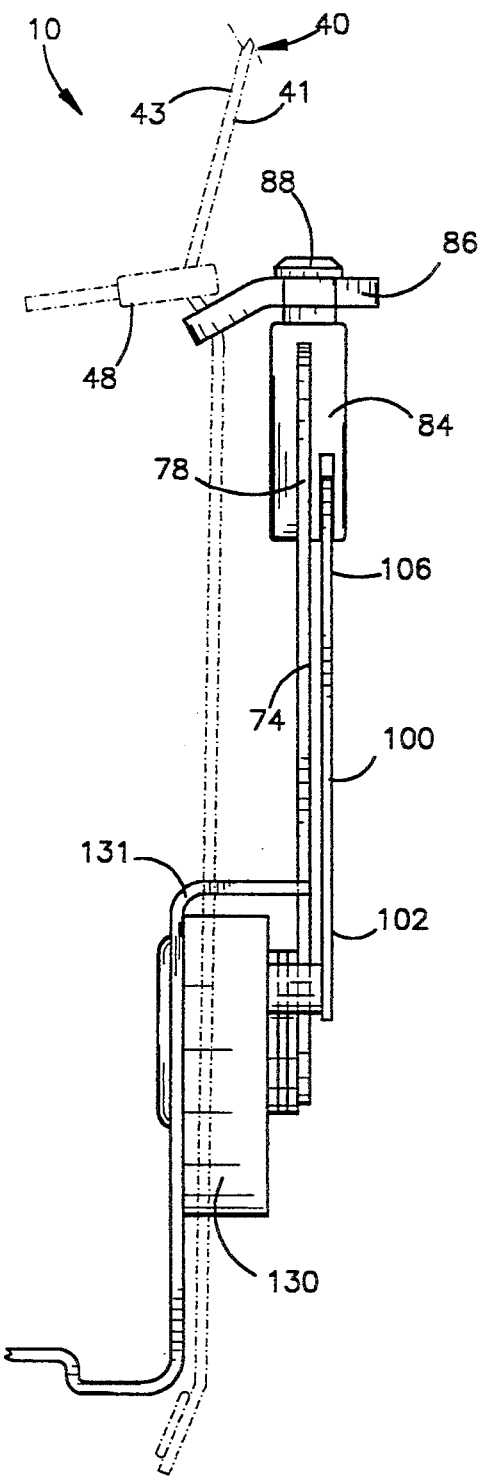
FIG. 3 is a view taken along line 3—3 of FIG. 2.

The seat belt system 14 includes a single continuous length of belt webbing 40 having opposite major side surfaces 41 and 43 (FIG. 3). The belt webbing 40 extends from a seat belt retractor 42 (FIG. 1) anchored at the base of the vehicle B-pillar 22. The belt webbing 40 extends upward from the retractor 42 through a D-ring 44 anchored at the top of the B-pillar 22. The belt webbing 40 extends from the D-ring 44 downward to an anchor 46 located on the vehicle seat base on the outboard side of the seat 16.

A tongue assembly 48 is slidable on the belt webbing 40. The tongue assembly 48 is manually engageable with a buckle 50 on the inboard side of the vehicle seat 16. The buckle 50 includes a buckle switch indicated schematically at 52 (FIGS. 1 and 7A). The buckle switch 52 includes a set of "buckled" electrical contacts 54 which are closed when the tongue assembly 48 is engaged with the buckle 50 and which are open when the tongue assembly is not engaged with the buckle. The buckle switch 52 also includes a set of "unbuckled" electrical contacts 56 which are closed when the tongue assembly 48 is not engaged with the buckle 50 and which are open when tongue assembly is engaged with the buckle.

Figure 2:
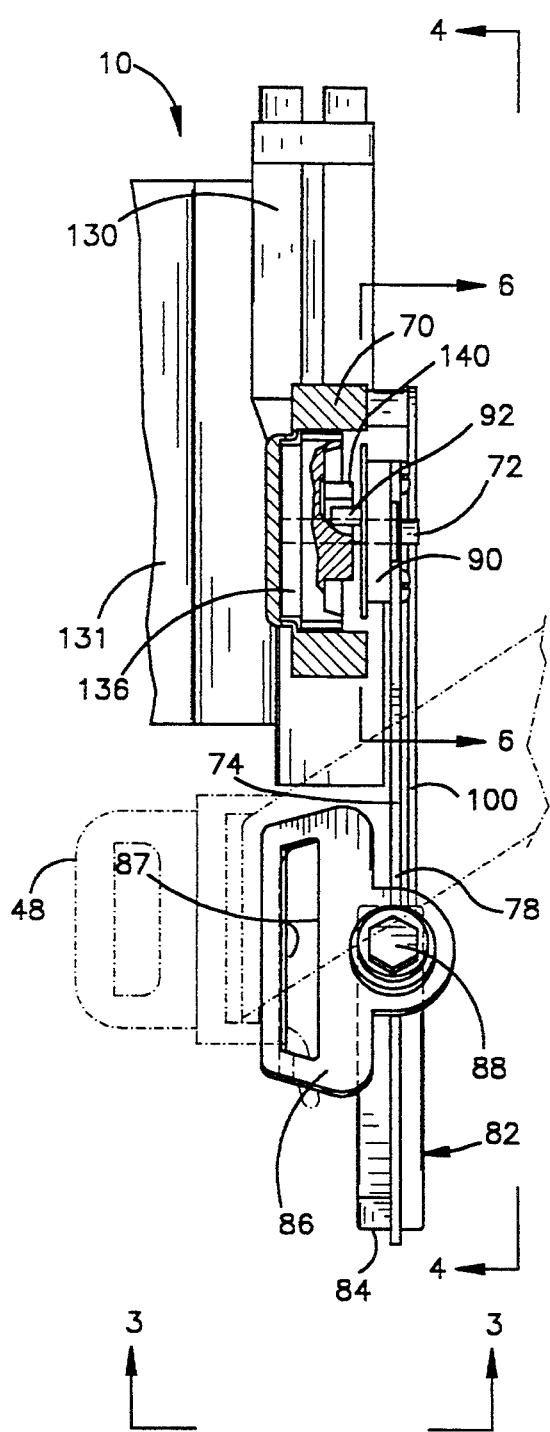
FIG. 2 is a top plan view, partly in section, of the presenter of FIG. 1.

The seat belt presenter 10 (FIGS. 2-4) includes a mounting bracket 70 fixed to the seat frame member 34 and thereby fixed for movement with the vehicle seat 16 relative to the vehicle body 20. A cylindrical metal pivot shaft 72 is fixed to the mounting bracket 70. A lift arm 74 has an inner end portion 76 supported for pivotal movement on the pivot shaft 72° The lift arm 74 has an outer end portion 78 with a pivot pin 80 on which a belt guide 82 is supported for pivotal movement relative to the lift arm 74.

The belt guide 82 includes a main body portion 84 and a D-ring 86 secured to the main body portion by a bolt 88. The D-ring 86 has surfaces 87 which define a D-shaped opening in the guide 82 through which the belt webbing 40 extends. The surfaces 87 of the D-ring 86 surround the opposite major side surfaces 41 and 43 of the belt webbing 40.

A hub 90 (FIG. 2) is fixed for movement with the lift arm 74. The hub 90 is supported for pivotal movement on the pivot shaft 72. A control pin 92 projects axially from the hub 90 in a direction parallel to and spaced from the pivot shaft 72. The control pin 92 is fixed for movement with the hub 90.

A link 100 (FIGS. 2-5) extends parallel to and is spaced from the lift arm 74. The link 100 has an inner end portion 102 supported for pivotal movement on a pin 104 fixed to the mounting bracket 70. The link 100 has an outer end portion 106 with a pivot pin 108 on which the main body portion 84 of the guide 82 is supported for pivotal movement relative to the link 100. The lift arm 74, the link 100, the guide main body portion 84, and the mounting bracket 70 together form a four-bar linkage or parallelogram linkage supporting the guide 82 for translational movement relative to the bracket.

A spring 110 (FIG. 4) extends between a tab 112 fixed to the lift arm 74 and a bracket 114 fixed to the vehicle seat 16. The spring 110 is loaded axially in tension and biases the lift arm 74 to pivot about the pivot shaft 72 in a first direction of movement as indicated by the arrow 120.

An electric motor 130 is selectively energizable to rotate in opposite directions. The motor 130 is mounted on a bracket 131 (FIG. 3) fixed to the vehicle seat 16. A worm gear 132 (FIGS. 4 and 6) is fixed on the output shaft of the electric motor 130. External teeth on the worm gear 132 are in meshing engagement with a series of gear teeth 134 on a worm wheel 136. The worm wheel 136 is supported on the mounting bracket 70 for rotation about the pivot shaft 72.

A cam lobe 140 is fixed for rotation with the worm wheel 136. A portion of the cam lobe 140 is in abutting engagement with the control pin 92 on the lift arm hub 90. The cam lobe 140 is also engageable with a step surface 142 on a cam follower 144. The cam follower 144 is supported for pivotal movement on a pin 146 fixed to the mounting bracket 70 in a manner not shown. The cam follower is biased into the cam 140 by a cam follower spring (not shown in FIG. 6). The cam follower 144 and its associated parts are, for clarity, not shown in FIGS. 4 and 5.

The cam follower 144 (FIG. 6) is operable through an intermediate member 148 to operate an "arm presented" switch 150 and a "arm stored" switch 152 which are disposed adjacent to the cam follower. The "arm presented" switch 150 is closed when the lift arm 74 is in the presented position shown in FIGS. 1A and 4 and the cam follower 144 is in the position shown in solid lines in FIG. 6. The "arm presented" switch 150 is open when the lift arm 74 is in the stored position shown in FIGS. 1B and 5 and the cam follower is in the position shown in dashed lines in FIG. 6. The "arm stored" switch 152 is closed when the lift arm 74 is in the stored position shown in FIGS. 1B and 5 and the cam follower 144 is in the position shown in dashed lines in FIG. 6. The "arm stored" switch 152 is open when the lift arm is in the presented position shown in FIGS. 1A and 4 and the cam follower 144 is in the position shown in solid lines in FIG. 6.

Figure 5:
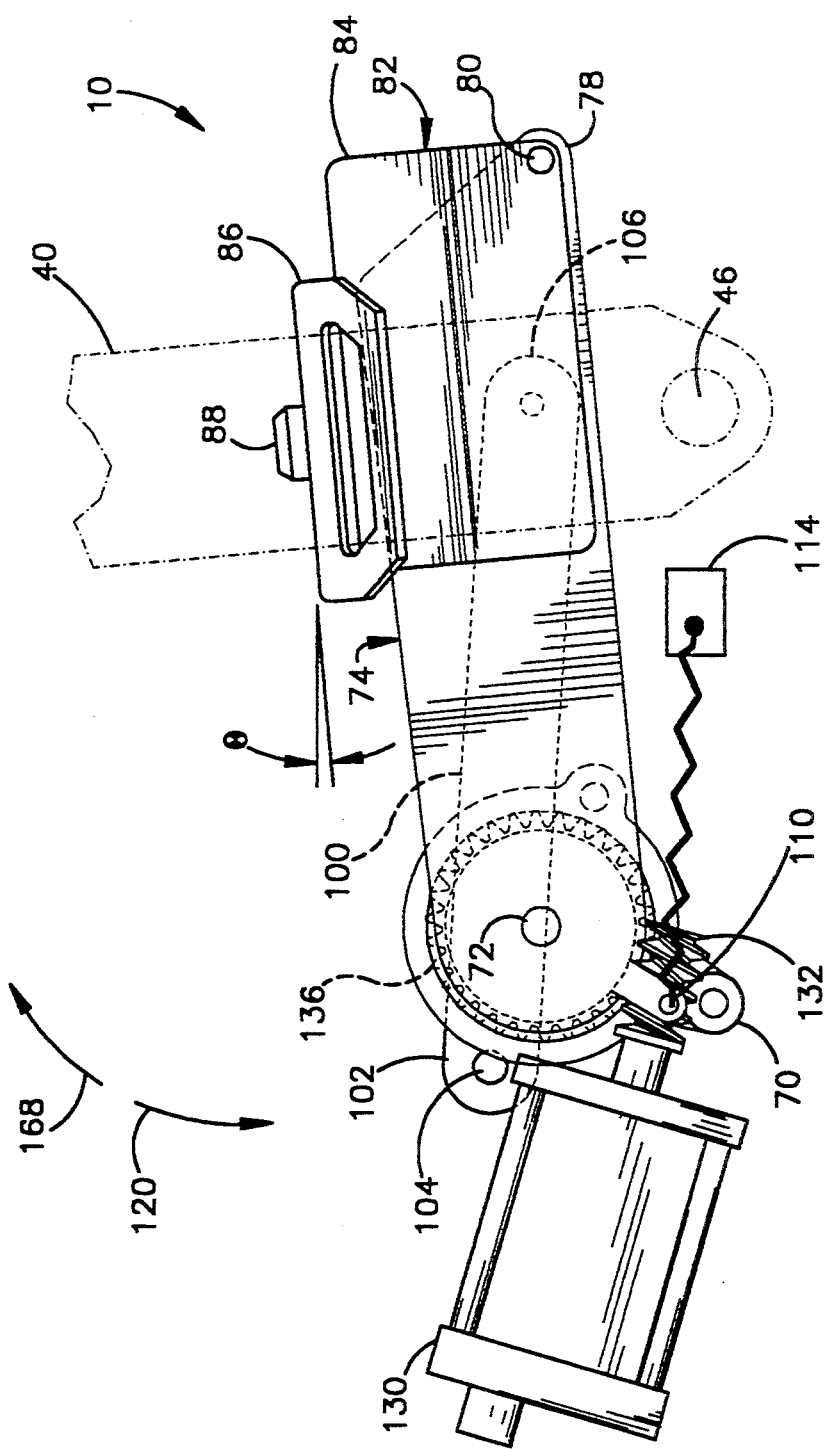
FIG. 5 is a view similar to FIG. 4 showing the lift arm in a stored position after buckling the seat belt.

When the vehicle 18 (FIG. 1) is parked and unoccupied, the vehicle seat 16 is not occupied and the seat switch 32 is open. The lift arm 74 is in the stored position as shown in FIGS. 1B and 5. The tongue assembly 48, although not shown in FIGS. 1B and 5, is disposed on the D-ring 86. The cam follower 144 is in a position as shown in dashed lines in FIG. 6, and so the "arm presented" switch 150 (FIGS. 6-7B) is open and the "arm stored" switch 152 is closed. The seat belt system 14 is unbuckled (i.e., the tongue assembly 48 is not engaged with the buckle 50), so the "unbuckled" contacts 56 of the buckle switch 52 are closed and the "buckled" contacts 54 are open.

Because of the state of the various switches, there is no path available for electric current to flow through the motor 130 between the positive and negative power supply leads 160 and 162 (FIG. 7A). Thus, the motor 130 does not operate in either direction. The lift arm 74 does not move between the presented position and the stored position.

When a vehicle occupant opens the vehicle door 24, sits in the seat 16, and closes the door, the electrical components assume the condition illustrated in FIG. 7A. The door 24 is closed, so the door switch 26 is closed. The vehicle seat 16 is occupied, so the seat switch 32 is closed. The lift arm 74 is in the stored position shown in FIGS. 1B and 5, so the "arm presented" switch 150 is open and the "arm stored" switch 152 is closed. The seat belt system 14 is unbuckled (i.e., the tongue assembly 48 is not engaged with the buckle 50), so the "unbuckled" contacts 56 of the buckle switch 52 are closed and the "buckled" contacts 54 of the buckle switch are open.

Because of the state of the various switches, there is formed a path (illustrated schematically by the arrow 164) for electric current to flow through the motor 130 between the positive and negative power supply leads 160 and 162. The motor 130 energizes and turns the worm gear 132 (FIG. 6). The worm wheel 136, which is in meshing engagement with the worm gear 132, rotates in the direction 120.

As the worm wheel 136 rotates in the direction 120, the cam lobe 140, which is fixed for rotation with the worm wheel, moves in the direction 120 away from the position of the control pin 92. The control pin 92, however, follows the cam lobe 140 because of the biasing force of the spring 110 acting through the tab 112, the lift arm 74 and the hub 90. The hub 90 thus rotates in the direction 120, and the lift arm 74 pivots about the pivot shaft 72. The lift arm 74 moves in the direction 120 from the stored position shown in FIGS. 1B and 5 toward the presented position shown in FIGS. 1A and 4.

As the cam lobe 140 rotates about the pivot shaft 72, the cam lobe moves in the direction 120 away from the cam follower 144. The cam follower 144 follows the cam lobe 140 due to the biasing effect of the cam follower spring. When the cam lobe 140 and cam follower 144 move in the direction 120 by a sufficient amount, to a position as shown in solid lines in FIG. 6, the cam follower no longer depresses the "arm presented" and "arm stored" switches 150 and 152. The "arm presented" switch 150 closes and the "arm stored" switch 152 opens. The opening of the "arm stored" switch 152 interrupts the electric current path 164 (FIG. 7A). This de-energizes the motor 130. The lift arm 74 is in its presented position. The guide 82 (FIG. 1) supports the tongue assembly 48 in a position adjacent to the vehicle occupant which allows easy access to the tongue assembly.

If a downward force in excess of the biasing force of the spring 110, such as the weight of an occupant's arm or another object, acts downward on the lift arm 74 while the lift arm is in the presented position or moving towards the presented position, the lift arm can stop moving or can move towards the stored position without load or damage to the motor 130, the worm gear 132, and the worm wheel 136. This is because the control pin 92 (FIG. 6) is free to move away from the cam lobe 140 as the lift arm 74 moves in the direction 168 from the presented position to the stored position.

After the lift arm 74 presents the tongue assembly 48, the vehicle occupant grasps the tongue assembly and engages it with the buckle 50. This engagement closes the "buckled" contacts 54 of the buckle switch 52 and opens the "unbuckled" contacts 56. The electrical components of the system 12 assume the condition shown in FIG. 7B. Because of the state of the various switches, there is formed a path indicated schematically at 166 for electric current to flow through the motor 130 between the positive and negative power supply leads 160 and 162. Electric current flows along the path 166 in a direction opposite to the direction shown by the path 164 in FIG. 7A.

The motor 130 as a result operates to cause movement of the lift arm in a direction 168, opposite to the direction 120, toward the stored position shown in FIGS. 1B and 5. Specifically, the motor 130 energizes to turn the worm gear 132 so as to turn the worm wheel 136 in the direction 168. This rotation of the worm wheel 136 moves the cam lobe 140 also in the direction 168.

The cam lobe 140 causes the control pin 92 (FIG. 6) to rotate about the pivot shaft 72 in the direction 168. The lift arm hub 90, which is fixed for movement with the control pin 92, also rotates in the direction 168. The lift arm 74 thus pivots about the pivot shaft 72 in the direction 168 from the presented position shown in FIGS. 1A and 4 toward the stored position shown in FIGS. 1B and 5.

The moving cam lobe 140 eventually engages the step surface 142 of the cam follower 144. The cam follower 144 pivots about the pin 146 to the position shown in dashed lines in FIG. 6. The cam follower 144 depresses the switches 150 and 152. The "arm stored" switch 152 closes and the "arm presented" switch 150 opens. The opening of the "arm presented" switch 150 interrupts the electric current path 166, de-energizing the motor 130. The lift arm 74 is in the stored position shown in FIGS. 1B and 5.

With the motor 130 thus de-energized, the lift arm 74 is maintained in its stored position shown in FIG. 5 due to the meshing engagement between the gear teeth 134 of the worm wheel 136 and the gear teeth of the worm gear 132. The biasing force of the spring 110 is not sufficient to overcome the resistance to movement caused by this meshing engagement.

When the vehicle occupant exits the vehicle 18, the occupant disengages the tongue assembly 48 from the buckle 50 and opens the door 24. When the door switch 26 is thus open, there is no path available for electrical current to flow through the motor 130 between the positive and negative power supply leads 160 and 162. Thus, the motor 130 does not operate in either direction. The lift arm 74 does not move between the stored position and the presented position.

When the vehicle door 24 is then closed after the occupant exits the vehicle 18, the motor 130 remains inoperative because the seat switch 32 is open and the "unbuckled" contacts 56 of the buckle switch 50 are open. The lift arm 74 does not move between the stored position and the presented position.

Figure 4:
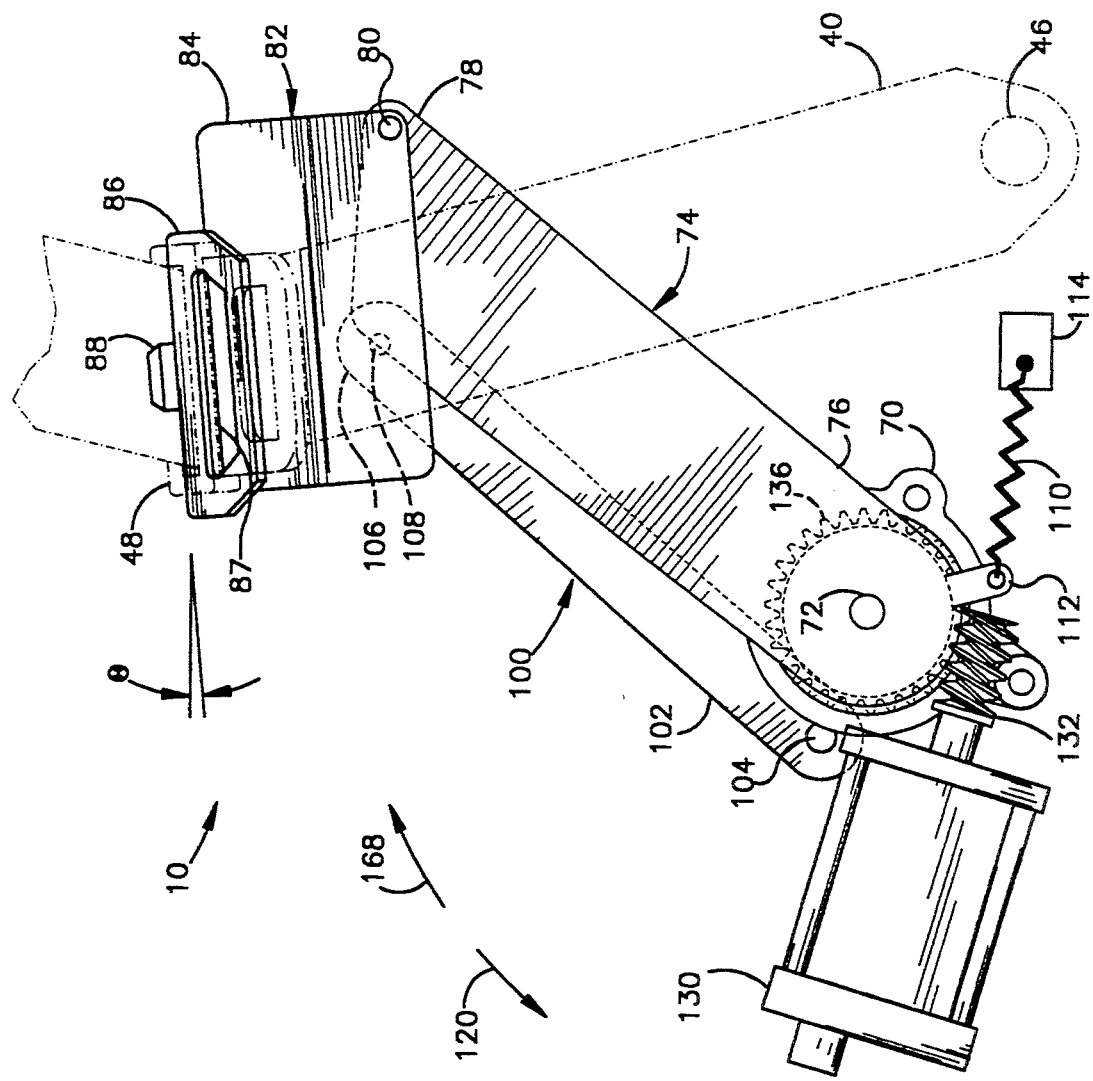
FIG. 4 is a schematic view with parts removed taken in the direction of line 4—4 of FIG. 2 and showing the lift arm in a presented position.

When the lift arm 74 moves in either direction 120 or 168 between the presented position and the stored position, the belt guide 82 remains at a substantially constant attitude angle Θ relative to horizontal (FIGS. 4 and 5). The angle is preferably about 15° off of horizontal. The guide 82 is maintained at the substantially constant attitude angle Θ because the lift arm 74, the link 100, the guide 82, and the mounting bracket 70 cooperate to form a four-bar linkage or parallelogram linkage arrangement. Because of this linkage, the attitude of the guide 82 relative to the seat 16 does not change as the lift arm 74 moves the guide between the stored and presented positions.

By maintaining the guide 82 at the substantially constant attitude angle Ⓡduring movement of the lift arm 74, the seat belt webbing 40 does not twist. Since the seat belt webbing 40 does not twist during movement of the lift arm 74, jamming of the belt webbing in the D-shaped opening in the D-ring 86 is avoided. Also, since the belt webbing 40 does not twist during movement of the lift arm 74 between its stored and presented positions, the belt webbing remains flat.

The electrical circuit shown in FIGS. 7A–7B is a relatively simple control circuit for controlling operation of the motor 130. By controlling operation of the motor 130, movement of the lift arm 74 between its presented and stored positions is controlled. It is contemplated that an electronic control circuit (not shown) including a microprocessor may be used to monitor input signals such as the state of each of the various switches and to provide a control output signal dependent upon the monitored input signals. The control output signal of the electronic control unit would control operation of the motor 130 depending upon the state of each of the monitored switches. Thus, movement of the lift arm 74 between its presented and stored positions would be controlled by the control output signal of the electronic control circuit generated in response to a number of monitored input signals.

Figure 8:
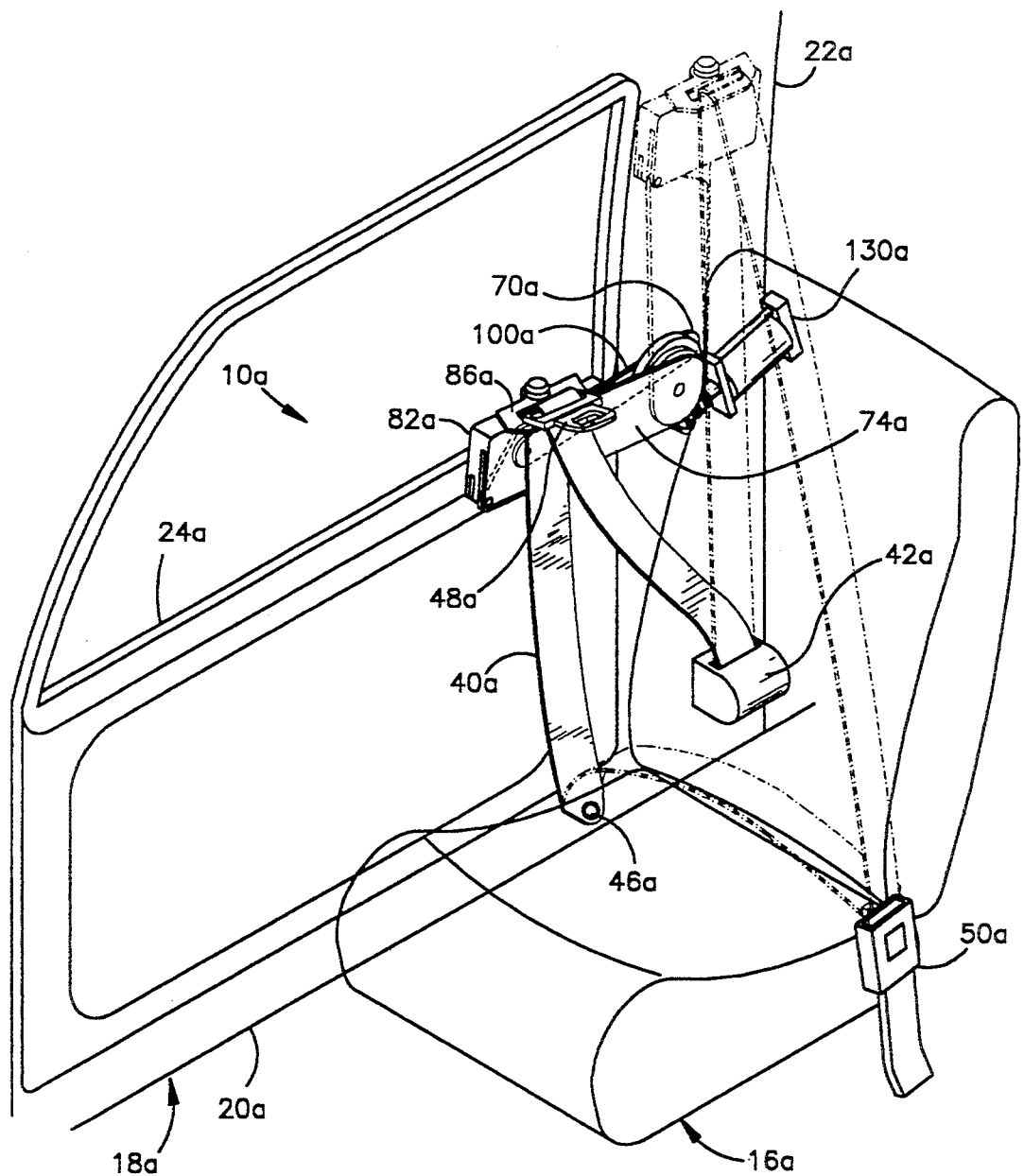
FIG. 8 illustrates a seat belt presenter in accordance with a second embodiment of the invention mounted on a vehicle B-pillar, showing the lift arm in solid lines in a presented position and in dashed lines in a stored position.

FIG. 8 illustrates a seat belt presenter 10a in accordance with a second embodiment of the invention. The seat belt presenter 10a is similar to the seat belt presenter 10 illustrated in FIGS. 1–6 but is mounted on the vehicle B-pillar rather than on the seat. Similar components are given the same reference numeral but with the suffix "a" added.

Thus, the seat belt presenter 10a includes a mounting bracket 70a fixed to the B-pillar 22a of the vehicle body 20a. Inner end portions of a lift arm 74a and of a link 100a are pivotally connected with the mounting bracket 70a. Outer end portions of the lift arm 74a and of the link 100a are pivotally connected with a belt webbing guide 82a. Belt webbing 40a extends from a retractor 42a through a D-ring 86a on the guide 82a and thence to an anchor 46a.

An electric motor 130a is operable, in the manner described above with reference to FIGS. 1–7B, to move the lift arm 74a and the guide 82a between a presented position as shown in solid lines in FIG. 8 and a stored position as shown in dashed lines in FIG. 8. When a vehicle occupant closes the door 24a and sits in the seat 16a, the motor 130a is energized to allow a spring (not shown) to pivot the lift arm 74a from the stored position shown in dashed lines in FIG. 8 to the presented position shown in solid lines in FIG. 8. When the lift arm 74a and the guide 82a are in the presented position, the D-ring 86a supports a tongue assembly 46a in a forward position more accessible to a vehicle occupant seated in the seat 16a. After the seated occupant engages the tongue assembly 46a with a buckle 50a, the motor 130a pivots the lift arm 74a and the guide 82a to the stored position shown in dashed lines in FIG. 8.

As in the first embodiment of the invention, the lift arm 74a, the link 100a, the guide 82a, and the mounting bracket 70a cooperate to form a four-bar or parallelogram linkage which maintains a constant attitude angle of the guide 82a, preferably 15° off of horizontal, as the guide moves between the presented and stored positions.

Although FIG. 8 does not show a D-ring fixed to the B-pillar 22a, one could be provided, similar to the D-ring 44 shown in FIG. 1. If a D-ring fixed to the B-pillar is provided, the belt webbing 40a would extend from the retractor 42a upward and through the D-ring fixed to the B-pillar, and thence to and through the D-ring 86a on the lift arm 74a.

From the above description of the invention, those skilled in the art to which the present invention relates will perceive improvements, changes and modifications in the invention. For example, the seat belt presenter 10 could be mounted to the vehicle body or floor at a location at the outboard side of the seat, rather than being mounted directly to the vehicle seat. Such improvements, changes and modifications within the skill of the art are intended to be covered by the appended claims.

Having described the invention, we claim:

1. A seat belt presenter for a seat belt system for restraining an occupant of a seat in a vehicle, the seat belt system including a length of belt webbing having opposite major side surfaces, a tongue assembly slidable along the belt webbing, and a buckle with which the tongue assembly is engageable to restrain the occupant, said seat belt presenter comprising:

a guide having surfaces which surround the opposite major side surfaces of the belt webbing;

a lift arm having an end portion to which said guide is attached, said lift arm being movable between a stored position and a presented position in which said guide supports the tongue assembly adjacent to the vehicle occupant, said guide surfaces moving relative to the opposite major side surfaces of the belt webbing as said lift arm and said guide move between said stored position and said presented position;

a spring which biases said lift arm and said guide to said presented position; and means for moving said lift arm and said guide to said stored position comprising an energizable motor for, when energized, moving said lift arm and said guide to said stored position.

2. A seat belt presenter as defined in claim 1 further including means for causing said guide to be maintained at a substantiality constant attitude angle as said lift arm and said guide move between said stored position and said presented position.

3. A seat belt presenter as defined in claim 2 wherein said means for causing said guide to be maintained at a constant attitude angle as said lift arm and said guide move between said stored position and said presented position comprises a four-bar linkage.

4. A seat belt presenter as defined in claim 2 wherein said constant attitude angle is about 15° off of horizontal, 5. A seat belt presenter as defined in claim 1 comprising means responsive to engagement of the tongue assembly with the buckle for energizing said motor to move said lift arm to said stored position.

6. A seat belt presenter as defined in claim 1 comprising electric control means electrically connected with said motor for controlling movement of said lift arm between said stored position and said presented position.

7. A seat belt presenter as defined in claim 1 comprising means for mounting said lift arm on the vehicle seat including means for supporting said lift arm for movement relative to the vehicle seat between said stored position and said presented position.

8. A seat belt presenter as defined in claim 7 further comprising means for causing said guide to be maintained at a constant attitude angle relative to the seat as said lift arm moves between said stored position and said presented position.

9. A seat belt presenter as defined in claim 7 comprising means responsive to engagement of the tongue assembly with the buckle for energizing said motor to move said lift arm to said stored position.

10. A seat belt presenter as defined in claim 7 comprising means for enabling movement of said lift arm in a direction from said presented position to said stored position in response to manual application of force to said lift arm.

11. A seat belt presenter as defined in claim 1 comprising means for mounting said lift arm on a B-pillar of the vehicle and for supporting said lift arm for movement relative to the vehicle B-pillar between said stored position and said presented position.

12. A seat belt presenter as defined in claim 11 wherein said lift arm when in the stored position extends generally vertically along the vehicle B-pillar and when in the presented position extends forward from the B-pillar, 13. A seat belt presenter as defined in claim 11 further comprising means for causing said guide to be maintained at a constant attitude angle as said lift arm moves between said stored position and said presented position.

14. A seat belt presenter as defined in claim 11 comprising means responsive to engagement of the tongue assembly with the buckle for energizing said motor to move said lift arm to said stored position.

15. A seat belt presenter as defined in claim 11 comprising means for enabling movement of said lift arm in a direction from said presented position to said stored position in response to manual application of force to said lift arm.

16. A seat belt presenter for association with a seat belt system for restraining a vehicle occupant, the seat belt system including a length of belt webbing having opposite major side surfaces, a tongue assembly slidable along the belt webbing, and a buckle with which the tongue assembly is engageable to restrain the occupant, said seat belt presenter comprising:

a guide having surfaces which surround the opposite major side surfaces of the belt webbing;
a lift arm having an end portion to which said guide is attached, said lift arm being movable between a stored position and a presented position in which said guide supports the tongue assembly adjacent to the vehicle occupant, said guide surfaces moving relative to the opposite major side surfaces of the belt webbing as said lift arm and said guide move between said stored position and said presented position; and
means for moving said lift arm and said guide between said stored position and said presented position and for causing said guide to be maintained at a constant attitude angle as said lift arm and said guide move between said stored position and said presented position.

17. A seat belt presenter as defined in claim 16 wherein said surfaces of said guide define a D-shaped opening through which the belt webbing extends.

18. A seat belt presenter as defined in claim 16 wherein said means for moving said lift arm and said guide includes an energizable motor for, when energized, moving said lift arm to said stored position.

19. A seat belt presenter as defined in claim 16 further including a spring biasing said lift arm and said guide to said presented position.

20. A seat belt presenter as defined in claim 19 further including switch means for controlling energization of said motor in response to movement of said lift arm and said guide between said stored position and said presented position.

21. A seat belt presenter as defined in claim 16 wherein said means for causing said guide to be maintained at a constant attitude angle as said lift arm and said guide move between said stored position and said presented position comprises a four-bar linkage.

22. A seat belt presenter as defined in claim 16 wherein said constant attitude angle is about 15° off of horizontal.

23. A seat belt presenter as defined in claim 16 wherein said means for moving said lift arm and said guide between said stored position and said presented position comprises a spring for moving said guide to said presented position, a member, and a motor energizable in a first direction of rotation to drive said lift arm to said stored position against the bias of said spring and energizable in a second direction of rotation opposite to said first direction of rotation to move said member out of engagement with said lift arm to enable said lift arm to move to said presented position under the bias of said spring.

24. A seat belt presenter as defined in claim 16 comprising means responsive to engagement of the tongue assembly with the buckle for moving said lift arm to said stored position.

25. A seat belt presenter as defined in claim 16 comprising means for mounting said lift arm on the vehicle seat including means for supporting said lift arm for movement relative to the vehicle seat between said presented position and said stored position.

26. A seat belt presenter as defined in claim 16 comprising means for mounting said lift arm on a B-pillar of the vehicle and for supporting said lift arm for movement relative to the vehicle B-pillar between said stored position and said presented position.

27. A seat belt presenter for a vehicle seat belt system, comprising:

a guide which guides a seat belt having opposite major side surfaces;
a lift arm having an end portion to which said guide is attached, said lift arm being movable between an up position in which the seat belt is away from an occupant in a seat of the vehicle and a down position in which the seat belt is adjacent the occupant, said guide having surfaces which surround the opposite major side surfaces of the seat belt and which move relative to the opposite major side surfaces of the seat belt as said lift arm and said guide move between said up and down positions;
a spring which biases said lift arm and said guide to said up position; and an energizable motor for, when energized, moving said lift arm and said guide to said down position.

28. A seat belt presenter as defined in claim 27 wherein said surfaces of said guide define a D-shaped opening through which the seat belt extends.

29. A seat belt presenter as defined in claim 27 wherein said spring has a first end portion connected with said lift arm and a second end portion connected in force-transmitting relationship with a portion of the vehicle, said spring being loaded axially in tension.

30. A seat belt presenter as defined in claim 27 further including switch means for controlling energization of said motor in response to movement of said lift arm between said up and down positions.

31. A seat belt presenter as defined in claim 27 further including means for causing said guide to be maintained at a substantially constant attitude angle as said lift arm and said guide move between said up and down positions.

32. A seat belt presenter as defined in claim 31 wherein said means for causing said guide to be maintained at a substantially constant attitude angle as said lift arm and said guide move between said up and down positions comprises a four-bar linkage.

33. A seat belt presenter as defined in claim 31 wherein said constant attitude angle is about 15° off of horizontal.

34. A seat belt presenter as defined in claim 27 wherein said motor is energizable in a first direction of rotation to drive said lift arm to said down position against the bias of said spring and said motor is energizable in a second direction of rotation opposite to said first direction of rotation to move a member out of engagement with said lift arm to enable said lift arm to move to said up position under the bias of said spring.

35. A seat belt presenter as defined in claim 27 comprising means for mounting said lift arm on the vehicle seat including means for supporting said lift arm for pivotal movement relative to the vehicle seat between said up and down positions.

36. A seat belt presenter for a seat belt system for restraining a vehicle occupant, the seat belt system including a length of belt webbing having opposite major side surfaces, a tongue assembly slidable along the belt webbing, and a buckle with which the tongue assembly is engageable to restrain the occupant, said seat belt presenter comprising:

a guide having surfaces which surround the opposite major side surfaces of the belt webbing;

a lift arm having an end portion to which said guide is attached, said lift arm being movable between a stored position and a presented position in which said guide supports the tongue assembly adjacent to the vehicle occupant, said guide surfaces moving relative to the opposite major side surfaces of the belt webbing as said lift arm and said guide move between said stored position and said presented position;

a spring which biases said lift arm and said guide to said presented position;

an energizable motor for, when energized, moving said lift arm and said guide to said stored position; and means for causing said guide to be maintained at a constant attitude angle as said lift arm moves between said presented and stored positions to maintain the seat belt flat.

37. A seat belt presenter as defined in claim 36 comprising means for mounting said lift arm on the vehicle seat including means for supporting said lift arm for movement relative to the vehicle seat between said stored position and said presented position.

38. A seat belt presenter as defined in claim 36 comprising means for mounting said lift arm on a B-pillar of the vehicle and for supporting said lift arm for movement relative to the vehicle B-pillar between said stored position and said presented position.

39. A seat belt presenter as defined in claim 36 comprising means responsive to engagement of the tongue assembly with the buckle for moving said lift arm to said stored position.

* * * * *